United States Patent [19]

Troutner et al.

[11] 4,014,201
[45] Mar. 29, 1977

[54] APPARATUS AND METHOD FOR FORMING TRUSS TUBULAR WEB COMPONENTS HAVING FLAT SYMMETRICALLY BIFURCATED ENDS

[75] Inventors: Arthur L. Troutner; Clifford R. Johnson, both of Boise; Stanley J. Willmorth, Eagle, all of Idaho

[73] Assignee: Trus Joist Corporation, Boise, Idaho

[22] Filed: Apr. 9, 1976

[21] Appl. No.: 675,494

[52] U.S. Cl. .................... 72/332; 72/367; 29/155 R
[51] Int. Cl.² ................................. B21D 28/00
[58] Field of Search ............ 29/33 T, 150, 155 R; 72/332, 367; 113/116 F, 116 HH

[56] References Cited

UNITED STATES PATENTS

| | | | |
|---|---|---|---|
| 1,828,235 | 10/1931 | Van Hattum | 29/155 R |
| 1,891,785 | 12/1932 | Siebert et al. | 72/367 |
| 2,133,092 | 10/1938 | Gettig | 72/332 |
| 3,754,428 | 8/1973 | Alexoff | 72/332 |
| 3,866,522 | 2/1975 | Oswalt | 72/332 |
| 3,972,215 | 8/1976 | Elkins | 72/332 |

Primary Examiner—Leonidas Vlachos
Attorney, Agent, or Firm—Eugene D. Farley

[57] ABSTRACT

Method for forming a symmetrically bifurcated terminal portion on an existing truss web component having a tubular medial portion and flattened web ends comprises shearing one of the web ends for removing tubing skin from its longitudinal margins, forming two unsupported side walls, and then flattening the side walls. The flattened side walls are wedged apart, separating them relative to one another and forming the symmetrically bifurcated terminal portion. The opposed web end is flattened, forming a comparatively large flattened terminal portion. The apparatus includes a frame having mounted thereon shearing means, splitting means, flattening means, and drive means for accomplishing the foregoing operations.

7 Claims, 31 Drawing Figures

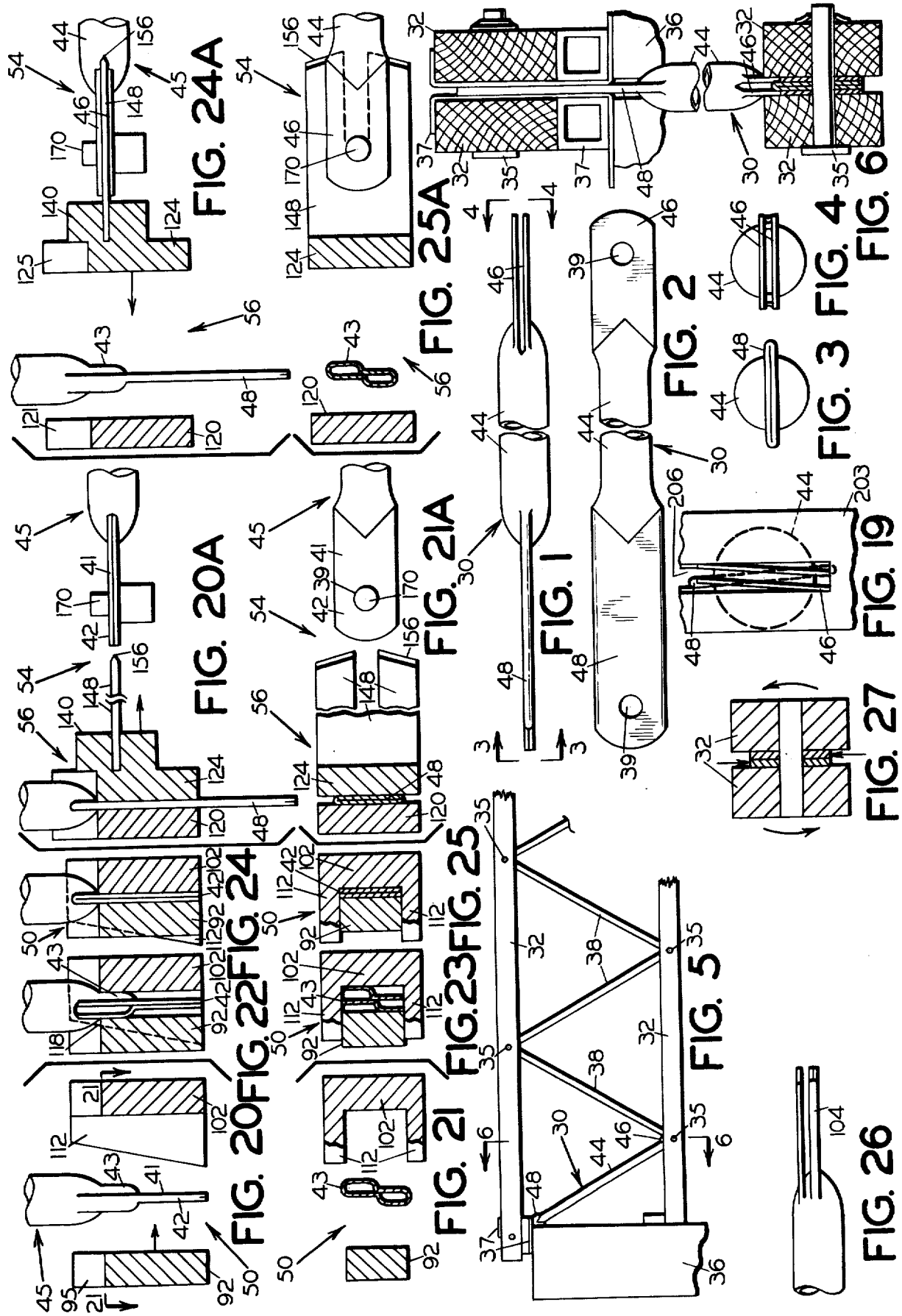

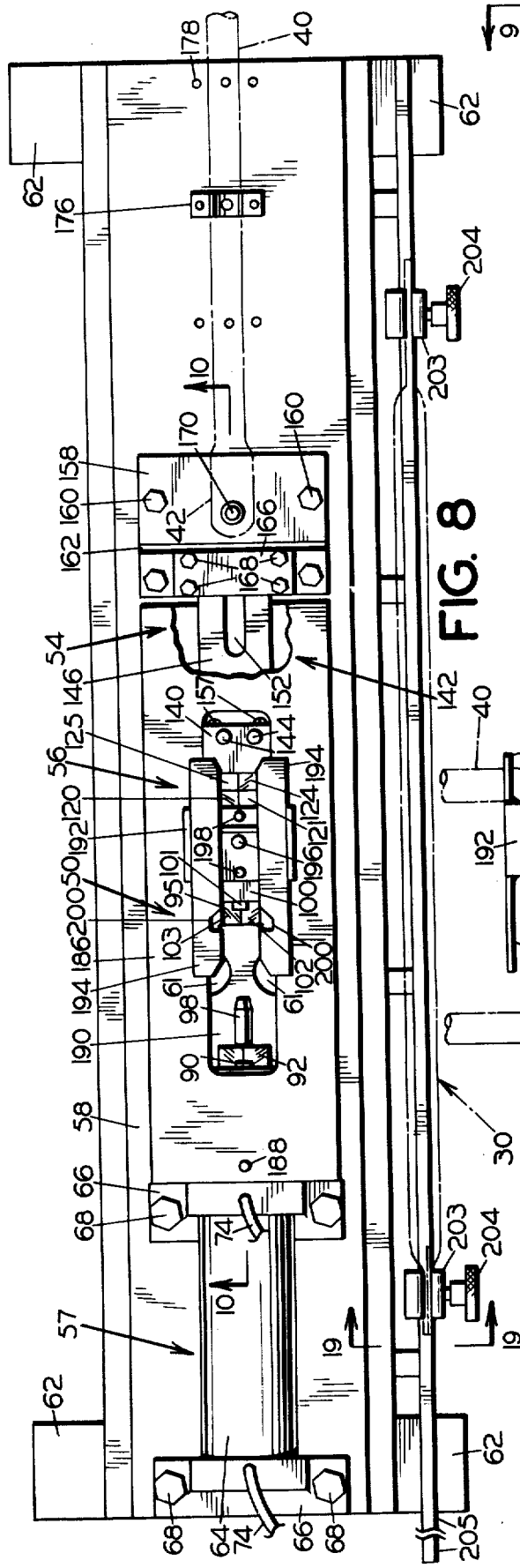
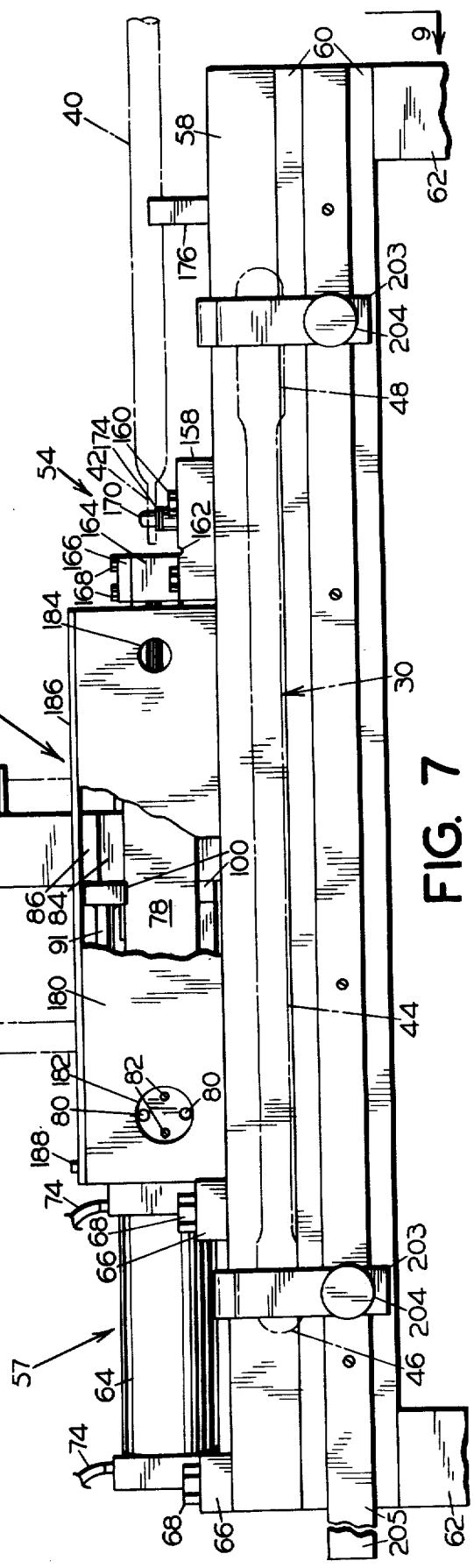
FIG. 8
FIG. 7

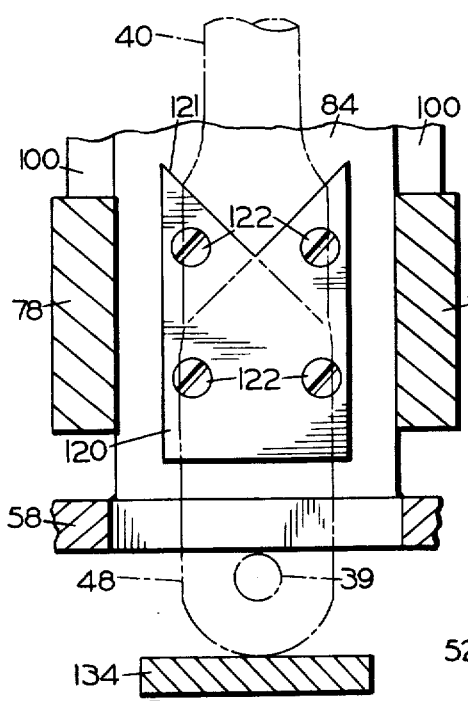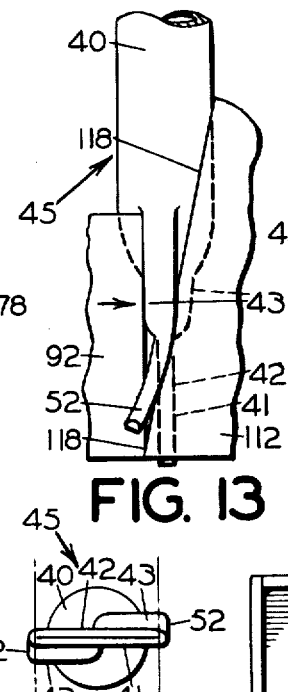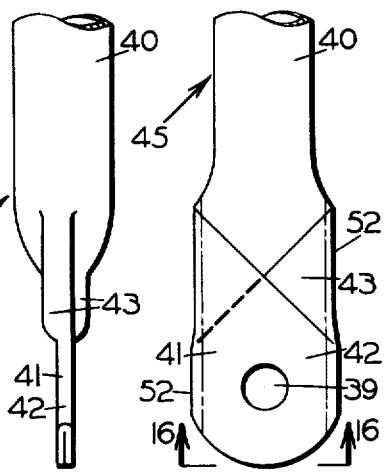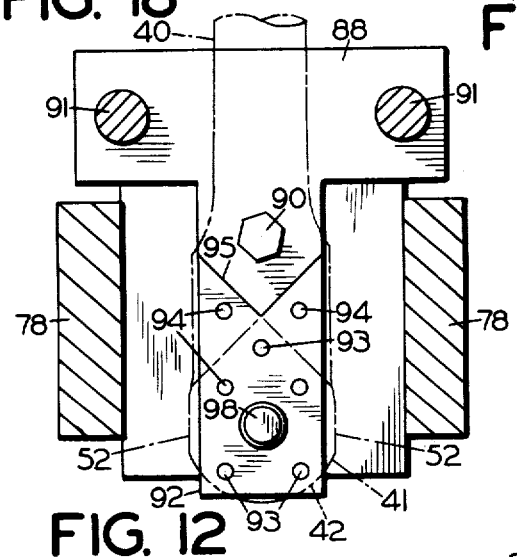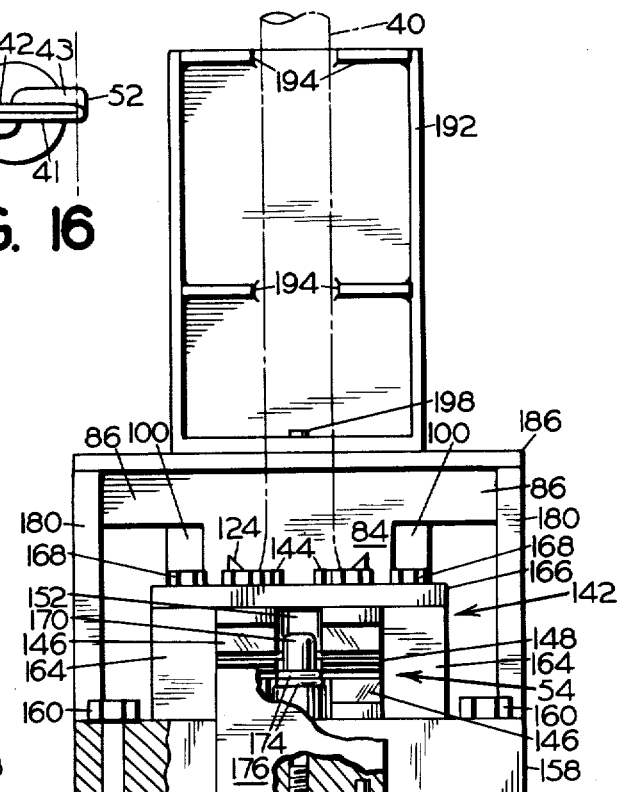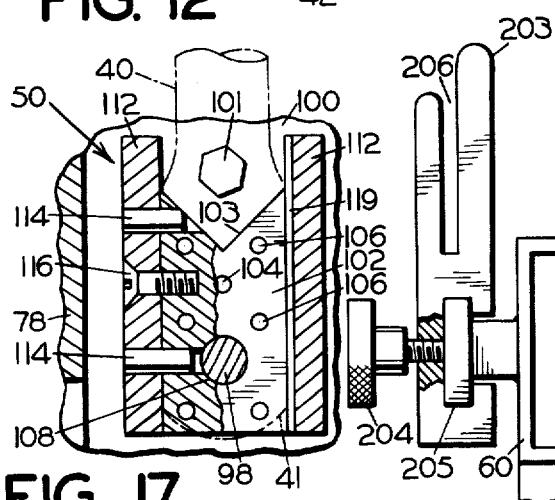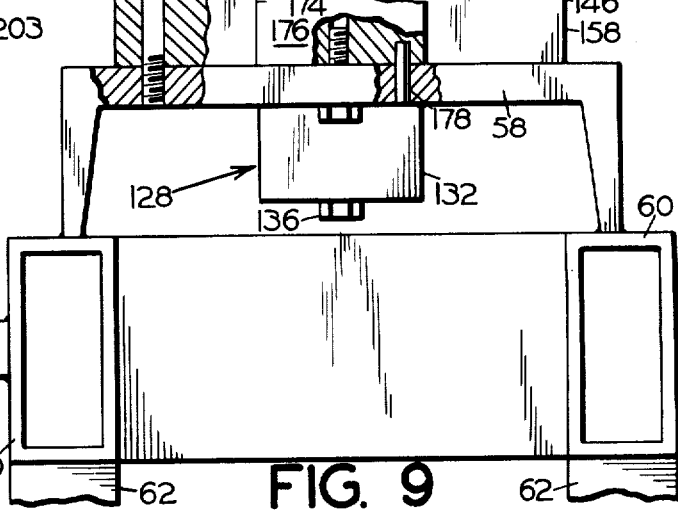

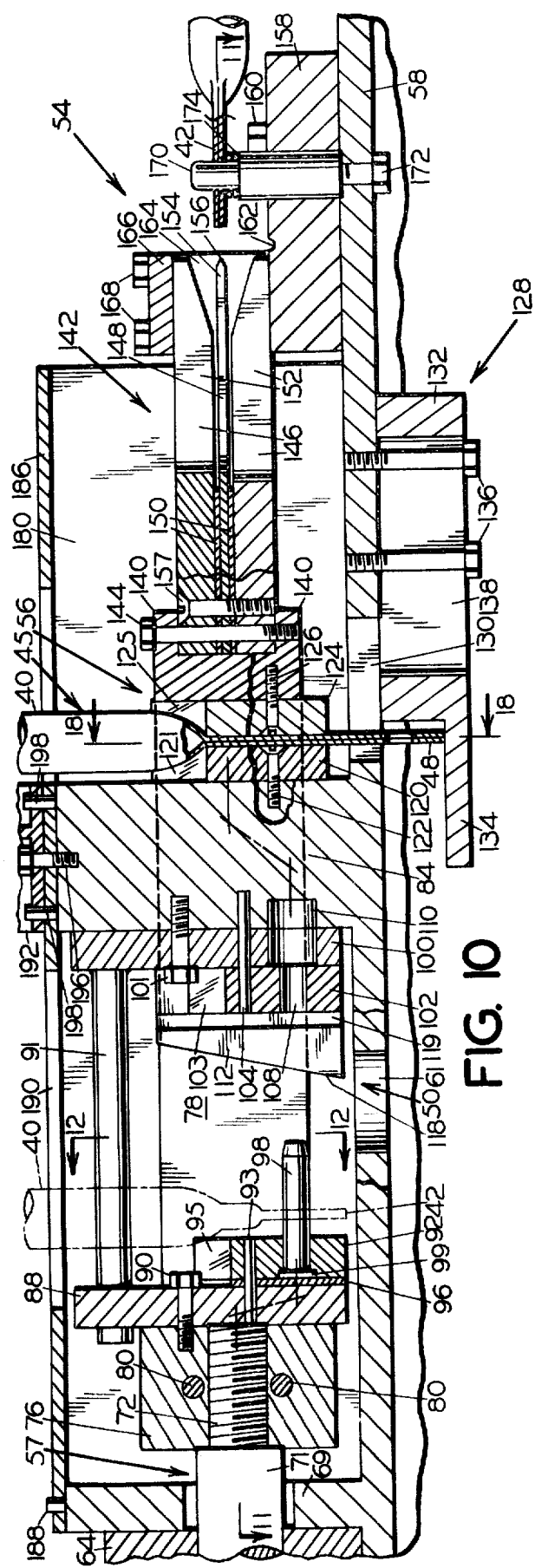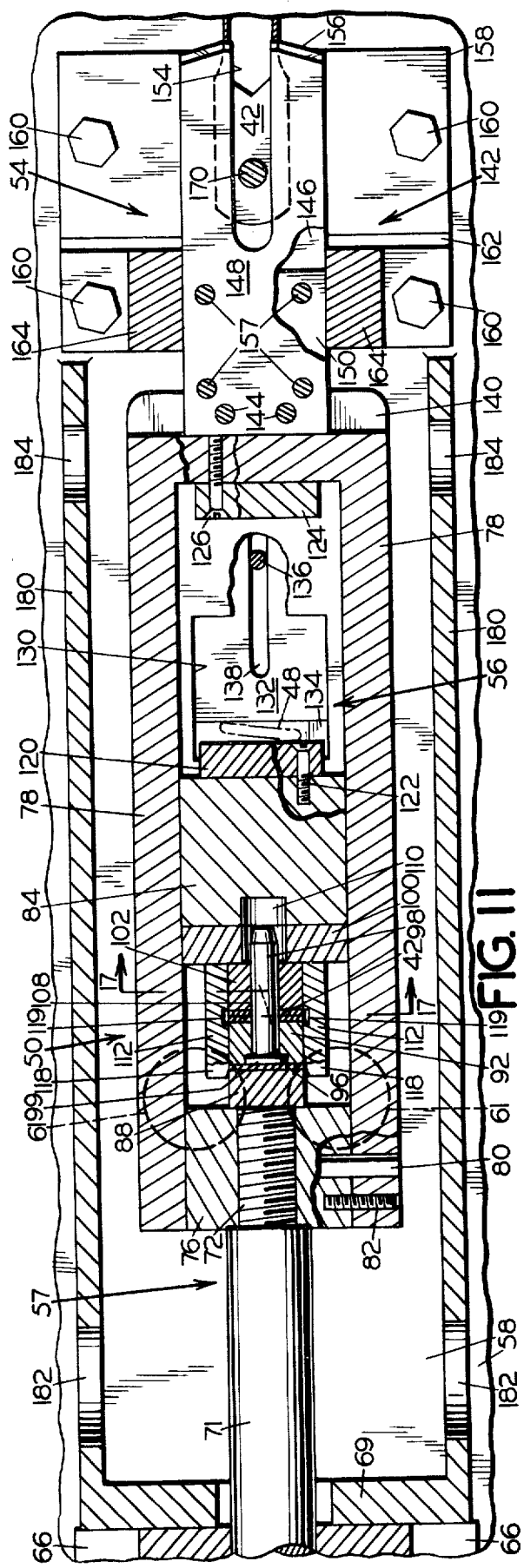

APPARATUS AND METHOD FOR FORMING TRUSS TUBULAR WEB COMPONENTS HAVING FLAT SYMMETRICALLY BIFURCATED ENDS

BACKGROUND OF THE INVENTION

This invention relates to method and apparatus for forming web components for trusses. It pertains particularly to method and apparatus for forming a web component having a flat symmetrically bifurcated end at one extremity and a larger flattened end at the other extremity.

Composite, open ended trusses are known in the prior art for supporting various structures. They generally include upper and lower wooden chords separated by webbing. The webbing comprises a plurality of web components formed from steel tubing and having flattened web ends at each extremity. The web ends of adjacent web components are located side by side and are joined to one another and to the chords by means of coupling pins positioned through holes located in the web ends and in the chords. The chords either have slots for receiving the web ends or comprise separated paired elements.

In the application of these trusses the end or starter web component normally is tied at its upper end to the bearing wall supporting the truss by means such as a bearing clip. For this reason the starter web component carries a larger load than the other web components when the truss is loaded.

Since each panel point in the truss, other than the panel point at the upper end of the starter web component, ties two web ends and the associated chord together through a common coupling pin the web ends necessarily are offset from one another. Thus the pin loading is asymmetrical and when a load is applied a twisting moment is created, causing undue strain and wear, decreasing the load-carrying capability of the truss. The adverse effect of this asymmetrical loading is most pronounced at the lower end of the starter web component due to the fact that it carries a higher load, so that the capability of this panel point becomes a critical factor in determining the load capacity of the truss.

Accordingly, it has been the practice to make the end or starter web component heavier, utilizing a larger diameter coupling pin than is used in coupling the remaining web components.

To prevent the occurrence of the foregoing problem inherent in the starter web component of the prior art trusses, it also has been proposed to join a second web end to the lower portion of the web component alongside and separated from the existing web end in a bifurcated arrangement designed to create symmetrical coupling pin loading. However, under present practice this additional web end must be joined to the web component, by such means as welding, which is a time consuming and costly separate operation. In addition, the second web end necessarily is offset from the existing web end which is located on the longitudinal centerline of the web component. Therefore, the additional web end must be located to one side or the other of the longitudinal centerline of the web component creating a web component which will cause asymmetrical loading when installed in a truss.

Also, as noted one end of the starter web component is tied to the bearing wall which supports the truss. This is accomplished by means of a bearing clip. The ends of the prior art web components are short since they must withstand bending when coupled with another web component at a panel point. Therefore, when they are installed in the bearing clip, there is not sufficient flattened area on the web end to couple them properly without interference between the clip and the web component.

It is therefore the general purpose of the present invention to provide method and apparatus for forming a truss web component having a symmetrically bifurcated web end.

It is a further purpose of the present invention to provide a method and apparatus which also forms a comparatively larger flattened web end on the opposite end of the web component giving increased web end area facilitating tying the web component to the bearing wall with a bearing clip.

It is a further purpose of the present invention to provide method and apparatus for forming such a web component having web ends which will not infringe upon the adjoining surfaces of the truss chord or the supporting foundation.

It is a further purpose of the present invention to provide accurate, quick and safe apparatus for forming such a web component.

It is a further purpose of the present invention to provide an apparatus for forming such web components of different sizes and thicknesses.

THE DRAWINGS

The manner in which the foregoing and other objects of the invention are accomplished will be apparent from the accompanying specification and claims, considered together with the drawings, wherein:

FIG. 1 is a foreshortened view, in side elevation of a starter web component formed by the method and apparatus of the present invention;

FIG. 2 is a foreshortened view in plan of the web component shown in FIG. 1;

FIG. 3 is a view in end elevation at an enlarged scale, looking in the direction of the arrows of line 3—3 of FIG. 1;

FIG. 4 is a view in end elevation at an enlarged scale, looking in the direction of the arrows of line 4—4 of FIG. 1;

FIG. 5 is a fragmentary, diagrammatic view, in elevation, of a truss incorporating the web component shown in FIG. 1;

FIG. 6 is a foreshortened, fragmentary, cross sectional view, at an enlarged scale, taken along the line 6—6 of FIG. 5;

FIG. 7 is a fragmentary view, in front elevation, of the apparatus of the present invention, with parts broken away for the convenience of illustration;

FIG. 8 is a view, in plan, of the apparatus shown in FIG. 7, with parts broken away for convenience of illustration;

FIG. 9 is a fragmentary view, in end elevation, at an enlarged scale, looking in the direction of the arrows of line 9—9 of FIG. 7, with parts broken away for convenience of illustration;

FIG. 10 is a fragmentary cross sectional view, at an enlarged scale, taken along the line 10—10 of FIG. 8, illustrating the apparatus in its retracted position;

FIG. 11 is a fragmentary cross sectional view, taken along the line 11—11 of FIG. 10, with parts broken away for convenience of illustration, showing the apparatus in its extended position;

FIG. 12 is a fragmentary cross sectional view, at an enlarged scale, taken along the line 12—12 of FIG. 10;

FIG. 13 is a diagrammatic, fragmentary view, in elevation, at an enlarged scale, illustrating a portion of the apparatus during its operation;

FIG. 14 is a fragmentary view, in side elevation, of an existing web component prior to forming in the apparatus;

FIG. 15 is a fragmentary view, in plan, of the web component shown in FIG. 14;

FIG. 16 is a view, in end elevation, looking in the direction of the arrows of line 16—16 of FIG. 15;

FIG. 17 is a fragmentary cross sectional view taken along the line 17—17 of FIG. 11;

FIG. 18 is a fragmentary view, in end elevation, taken along the line 18—18 of FIG. 10;

FIG. 19 is a fragmentary cross sectional view taken along the line 19—19 of FIG. 8;

FIG. 20 is a fragmentary, diagrammatic, cross sectional view showing a portion of the apparatus in its retracted position;

FIG. 20A is a fragmentary, diagrammatic, foreshortened, cross sectional view showing another portion of the apparatus in its retracted position;

FIG. 21 is a diagrammatic, cross sectional view, taken along line 21—21 of FIG. 20;

FIG. 21A is a foreshortened, fragmentary, diagrammatic, cross sectional view, in plan, of that portion of the apparatus shown in FIG. 20A;

FIG. 22 is a fragmentary, diagrammatic, cross sectional view similar to that shown in FIG. 20, with the apparatus partially extended;

FIG. 23 is a diagrammatic, cross sectional view, in plan, of that portion of the apparatus shown in FIG. 22;

FIGS. 24 and 24A are fragmentary, diagrammatic, cross sectional views similar to that shown in FIG. 20 with the apparatus in fully extended position;

FIG. 25 is a diagrammatic, cross sectional view, in plan, of that portion of the apparatus shown in FIG. 24;

FIG. 25A is a fragmentary, diagrammatic, cross sectional view, in plan, of that portion of the apparatus shown in FIG. 24A;

FIG. 26 is a fragmentary view, in side elevation, of a prior art web component; and FIG. 27 is a fragmentary, cross sectional view showing the installation of a prior art web component.

GENERAL STATEMENT OF THE INVENTION

The method of my invention broadly comprises shearing the side margins of the flattened web end of an existing truss web component and splitting the resulting unsupported sides forming a symmetrically bifurcated terminal portion. The opposite web end of the web component then is flattened forming a larger flattened terminal portion.

Combination shearing and flattening means sequentially shears the tubing skin from the longitudinal side margins of one of the web ends forming two unsupported side walls without flattening, and thereafter flattens the just formed side walls. Splitting means separates the unsupported side walls from each other, forming the symmetrically bifurcated terminal portion. Second flattening means then flattens the opposite web end forming the larger flattened terminal portion.

Activation means operably engages the shearing means, the splitting means, and the flattening means, which are located on a common frame, to shear, split and flatten the web end, respectively.

DETAILED DESCRIPTION OF A PREFERRED EMBODIMENT

Referring to FIGS. 5 and 6, the apparatus and method of the present invention are intended for forming a starter or end web component 30 for use in composite trusses having wooden chords 32 interconnected by a lacing of conventional web components 38 coupled together with cross pins 35. The starter web is secured to the bearing wall 36 supporting the truss along with the chords by means of bearing clips 37.

The starter web component 30, FIGS. 1 and 2, is formed from an existing web component 45 having a tubular medial portion 40 and flattened web ends 41. A typical existing web component is shown in FIGS. 14, 15 and 16. It has relatively short, flattened terminal portions 42 each containing a circular coupling pin hole 39, and adjacent triangular semiflattened portions 43.

The starter web component formed by the apparatus is shown in FIGS. 1, 2, 3 and 4. It comprises a tubular medial portion 44 having a flattened, symmetrically bifurcated terminal portion 46 and an opposite, comparatively larger, flattened terminal portion 48.

Referring now to FIGS. 7 and 8, the apparatus generally includes combination shearing and flattening means 50, splitting means 54, second flattening means 56 and drive means 57 which operate sequentially to form the web component.

The shearing and flattening means shears the skin 52, FIGS. 15 and 16, from the opposite longitudinal margins of one of the web ends 41 of the existing web, forming unsupported side walls. It then flattens the web end and removes the semiflattened portion forming a fully flattened terminal portion.

The splitting means 54 wedges apart this fully flattened terminal portion and separates the side walls from each other, forming the bifurcated terminal portion 46.

The second flattening means 56 flattens the other web end, forming the larger flattened terminal portion 48. The drive means 57 operatively engages the shearing means, the splitting means and the flattening means for the activation thereof.

The above operative members of the invention are mounted on an inverted, U-shaped mounting deck 58 which is attached rigidly to parallel box frame element 60. Openings 61 are positioned at selected locations in the mounting deck for passage of material removed from the web ends. Legs 62 depend from joinder to the corners of the box frame positioning the apparatus above a supporting surface.

THE DRIVE MEANS

The drive means 57, which drives all of the foregoing units, preferably comprises a double-acting hydraulic cylinder 64. Mounting means, such as blocks 66, rigidly joins the hydraulic cylinder to the left hand ends of the mounting deck, as shown in FIGS. 7 and 8 by means of bolts 68. Referring to FIGS. 10 and 11, an hydraulic cylinder ram 71 extending from the hydraulic cylinder has a threaded terminal portion 72. Hydraulic tubing 74 transmits pressurized hydraulic fluid from a pump (not shown) and appropriate controls (not shown) allow reciprocation of the ram between an extended position, shown in FIG. 11, and a retracted position, shown in FIG. 10.

THE SHEARING AND FLATTENING MEANS

As noted the combination shearing and flattening means 50, FIGS. 10 and 11, shears the skin 52 from the opposite longitudinal margins of one of the web ends and then flattens the web end forming a fully flattened terminal portion. Attached to the threaded terminal portion 72 of the ram is a rectangular ram block 76 having a medial threaded bore. The ram block transmits the reciprocating movement of the hydraulic cylinder to the shearing means.

A U-shaped guide 78 defining a central cavity having a width substantially equal to the width of the ram block and extending nearly one-half the length of the mounting deck 58 is located slidably a spaced distance above the mounting deck, as best shown in FIGS. 10 and 11. The guide is attached at its open end to the ram block by means of locating pins 80 and bolts 82.

The guide fits over a rectangular central guide block 84 which is attached rigidly and centrally on the deck by means such as welding. Tabs 86 are located on each side of the central guide block for aligning it in the apparatus.

Mounted on the right-hand face of the ram block 76 is a T-shaped guide plate 88. The guide plate is attached to the ram block by means of bolt 90 and bolts 94.

A shear index 92 having a V-shaped upper notch 95 is aligned and attached to the right-hand surface of the guide plate by means of pins 93 and bolts 94, FIG. 12. Shims 96 are located removably between the shear index and the guide plate allowing selective longitudinal extension of the apparatus. Extending horizontally from a medial bore in the shear index is a cylindrical guide pin 98 which is dimensioned to fit within the coupling pin holes in the web components. The guide pin is pressed into the bore in the shear index and retained therein by means of an enlarged shoulder 99. Thus the guide pin may be replaced by another having a diameter corresponding to an alternate coupling hole diameter by replacement of the shear index and guide pin. The shear index also may be replaced by one having a larger or smaller width to accommodate web components of different widths.

A T-shaped forming guide 100 is attached to the left hand face of the central guide block 84 by bolt 101 and bolts 106. Pin 104 aligns the forming guide oppositely the guide plate 88. Horizontal guide rods 91 extend from joinder to the forming guide through sliding engagement with bores located in the top legs of the guide plate 88 to guide the shearing means accurately during reciprocation of the hydraulic cylinder.

A forming block 102, dimensioned similarly to the shear index, and having an upper notch 103, is mounted on the forming guide 100. The forming block is aligned opposite to the shear index by pin 104 and attached to the forming guide by bolts 106, FIG. 17. A medial bore 108 is positioned in the forming block for engaging the guide pin snugly and a larger diameter coaxial bore 110 is positioned through forming guide 100 and into the central guide 84 for receiving the guide pin freely.

Paired shear plates 112 are attached to the sides of the forming block by means of pins 114 and screws 116, FIG. 17. They extend outwardly therefrom toward the shear index 92. They have sloped leading edges 118 providing sharp shear surfaces at their inner margins. Vertical slots 119 are located in the inwardly facing surfaces of the shear plates allowing for expansion of the web end during flattening.

THE SECOND FLATTENING MEANS

The second flattening means 56, FIGS. 10 and 11, for forming the large flattened terminal portion 48 on the other end of the web component, is located at the right hand end of the guide 78 and includes a rectangular first flattening block 120 having an upper V-shaped notch 121, mounted centrally on the right hand side of the central guide block by means of screws 122, FIG. 18. A mating second flattening block 124, dimensionally similar to the first flattening block, and having a mating V-shaped notch 125 is attached to the end of the guide 78, in alignment with the first flattening block, by means of screws 126.

Indexing means 128, FIG. 10, is mounted to the lower surface of the mounting deck 58 below the first flattening block, for indexing the web component longitudinally within the flattening means. A rectangular opening 130 is located in the mounting deck allowing passage of the web component into engagement with the indexing means.

The indexing means comprises a rectangular block 132 having an integral planar index tab 134 extending outwardly from its left hand edge. The upper surface of the index tab is spaced below the mounting deck for forming a web having a flattened terminal portion 48 of the desired length. Bolts 136 which pass through a slot 138 located in the medial portion of the rectangular block 132 into threaded engagement with the mounting deck secure the indexing means to the mounting deck. Thus the indexing means is adjustable longitudinally along the mounting deck allowing twisting of the web end counterclockwise a predetermined amount prior to flattening. This compensates for the clockwise twisting which occurs normally during the flattening.

A gauge, FIGS. 7, 8 and 10, is attached to one side of frame 60 for determining if the amount of twisting compensation was correct and if the web ends are aligned.

Gauge blocks 203 are attached releasably by thumb screws 204 to threaded bores located in tabs 205 mounted on the frame. The gauge blocks have bifurcated ends defining a medial slot 206 configured to receive the web ends. The slots are sized in such a manner that if the opposed web ends will simultaneously fit within their associated slots they are properly aligned.

THE SPLITTING MEANS

As noted the splitting means 54, FIGS. 10 and 11, wedges apart the sheared web end separating the walls from one another forming the bifurcated terminal portion 46, FIGS. 1 and 4.

Mounted to the right hand extremity of the guide 78, between top and bottom ears 140, is the splitter blade assembly 142. Bolts 144 join the splitter blade assembly rigidly to the guide. The splitter blade assembly comprises upper and lower splitter guides 146 and a splitter blade 148 sandwiched therebetween. Spacers 150 separate the splitter blade from both splitter guides at their inner portions. The outer portions of the splitter guides and the splitter blade are bifurcated forming openings 152 and 154 respectively. An angled, sharpened cutting edge 156 is located at the outer extremity of the splitter blade. Screws 157 join the elements of the splitter blade assembly together in a single unit.

The splitter blade assembly 142 is supported by means of a rectangular splitter guide block 158 which is mounted to the mounting deck by means of bolts 160. A debris removal channel 162 is located laterally in the top surface of the splitter guide block approximately at its longitudinal center. Rectangular side guide blocks 164 extend upwardly from the inner portion of the splitter guide block for guiding the sides of the splitter blade assembly laterally. The splitter blade assembly is guided on its upper surface by means of upper guide plate 166 which is attached to the side blocks by means of bolts 168.

Medially located in the outer portion of the splitter guide block 158 is an index pin 170 configured to engage the coupling pin hole of the web end snugly, indexing the web component longitudinally in the splitting means. The pin, which is mounted by means of a bolt 172, includes a larger diameter shoulder located slightly below the level of the splitter blade upon which rubber O-rings 174 may be placed, FIG. 9. The rubber O-rings support the web end resiliently allowing it to be displaced slightly relative to the splitter blade during the splitting. Thus the web end is split symmetrically.

A support bracket 176, FIG. 7, configured to engage the tubular medial portion of the web component releasably is attached to the mounting deck at one of several longitudinal locations by means of locating holes 178 aligning the center line of the web component angularly with respect to the splitting means.

The apparatus is enclosed by rectangular side plates 180 which are integral with the end plate 69. Access holes 182 are located at the left hand ends of the side plates allowing access to the guide attachment bolts 82. Debris removal openings 184 located at the right hand ends of the side plates allow observation and cleaning of the splitter blade assembly.

A top plate 186, FIG. 10, fits on top of the end plate to cover the apparatus. It is positioned on a locating pin 188 joined to the top surface of the end plate 69. Access to the apparatus for insertion of the web components into the shearing means and flattening means is provided by a rectangular opening 190 centrally located in the top plate.

A box-like alignment bracket 192, FIG. 9, having paired alignment plates 194 located at two vertical positions above the top plate is mounted to the central guide block 84 by means of a bolt 196 and locating pins 198. The alignment plates are chamfered at both ends allowing ease of entry of the web component which it aligns during the shearing and flattening. The forward ends of the alignment plates also contain medial cutouts 200. The alignment bracket is located above the top plate so that its mounting bolt 196 also secures the top plate to the side plate.

OPERATION

The operational sequence of the present invention is shown diagrammatically in FIGS. 20–25 and FIGS. 20A, 21A, 24A and 25A. Since the apparatus is configured to perform some of the various operations simultaneously, the sequence used in forming the web component is not fixed. However, the following description will cover the normal sequence for forming a first and following web component without the availability of previously partially formed web components.

With the hydraulic cylinder 64 placed in its retracted position, as shown in FIGS. 10, 20 and 21, one web end of a first existing web component is inserted into the shearing means 50 with its coupling pin hole 39 placed over guide pin 98. At this point the web component substantially is not supported by the apparatus and must be held upright by the operator.

Upon activation of the controls, the hydraulic cylinder ram is extended slowly (FIGS. 20 and 21) with the shear index 92 loosely engaging the web component and moving it toward the right whereupon it comes into engagement with the alignment bracket 192 relieving the operator from the necessity of providing further support.

Further extension of the ram brings the web end into engagement with the shear plates 112 (FIGS. 22 and 23), which shears the tubing skin 52 (FIGS. 13, 15 and 16) from the longitudinal margins of the web end without flattening, forming two unsupported side walls from the web end 41 and the semiflattened portion 43 of the web component. Finally, with the ram in its fully extended position (FIGS. 11, 24 and 25), the just formed unsupported side walls are flattened between the shear index 92 and forming block 102 forming the fully flattened terminal portion.

The opposite web end of a second web component then is placed in the flattening means, as shown by FIGS. 24A and 25A. It will be noted that the medial portion of the web component may be placed in the alignment bracket when the web component is placed in the flattening means so that operator support is not required.

Referring to FIG. 11, the web component is twisted clockwise in the forming means placing one edge in contact with block 132 of the indexing means which has been positioned longitudinally on the mounting deck. Thus when the web end is flattened the counterclockwise twisting normally encountered when flattening a tubular element is compensated for locating the large, flat terminal portion radially coplanar with the opposite web end. The controls are activated again moving the hydraulic cylinder ram to its retracted position.

As the ram moves to its retracted position, FIGS. 20A and 21A, the semiflattened portion of the web end and a portion of the tubular medial portion of the web component are flattened between the first and second flattening blocks 120 and 124 respectively, forming the large flattened terminal portion 48, as shown in FIGS. 1 and 2. Simultaneously the shearing means is opened permitting removal of the web component located therein.

Since the side walls of the web component located in the shearing means have expanded slightly during the flattening extending into slots 119 of the shear plates, the web must be lifted straight upwardly without twisting. Thus the web end passes through cutouts 200 of the alignment bracket.

The just formed side walls on the first web component then are positioned in the splitting means as shown in FIGS. 10, 20A and 21A, by placing the coupling pin hole over index pin 170. The medial portion of the web component is secured to the mounting deck by means of support brackets 176. If desired the first end of a third web component also may be located in the shearing means in the manner just described.

The controls are activated again shifting the hydraulic cylinder ram to its extended position, translating the splitter blade to the right and wedging apart the unsupported side walls relative to one another. This forms the symmetrically bifurcated terminal web portion 146, FIGS. 24A and 25A. The flattening means are simultaneously opened allowing removal of the web component located therein.

A fourth web component is placed in the flattening means and the ram again retracted flattening the web end of this fourth web and releasing the first web component in the splitting means and the third web component in the shearing means.

It will be noted that now web ends having undergone each of the operations are available so that maximum usage of the apparatus may be accomplished during further activation of the hydraulic cylinder ram. The actual sequence of operation from this point will vary from operator to operator. However, completed web components having one large flattened terminal portion and an opposite symmetrically bifurcated terminal portion are formed accurately, quickly and safely with each additional activation of the hydraulic cylinder ram.

It also will be noted that the pliant O-rings 174 support the web end allowing it to self center on the splitter blade forming a bifurcation which is symmetrical about the center line of the web component, FIGS. 1 and 4. The prior art bifurcated terminal portion 104, FIG. 26, formed by welding an additional web end on the web component along side of the existing web end, has been asymmetrical with one web end on the center line of the web component and the other offset from the center line.

Having thus described my invention in preferred embodiment, I claim:

1. An apparatus for forming a symmetrically bifurcated terminal portion on an existing truss web component having a tubular medial portion and flattened web ends defining medial coupling pin holes, comprising
    a. a frame,
    b. shearing and flattening means located on the frame and configured for shearing the tubing skin from the longitudinal margins of one of the web ends forming two unsupported side walls without flattening of the web ends, and sequentially thereafter flattening the just formed side walls,
    c. splitting means located on the frame configured for indexing the unsupported side walls and separating them relative to one another forming a symmetrically bifurcated terminal portion, and
    d. drive means operatively engaging the shearing means and the splitting means for the activation thereof.

2. The apparatus of claim 1 wherein the shearing means includes an index pin configured to engage the coupling pin holes in the web ends for indexing them relative to the shearing means.

3. The apparatus of claim 1 wherein the splitting means includes an index pin configured to engage the coupling pin holes in the web ends for indexing them relative to the splitting means.

4. The apparatus of claim 3 wherein the splitting means is configured to receive the web component horizontally and the index pin contains a shoulder located a spaced distance below the preferred position of the side walls of the web end relative to the splitting means, and pliant O-rings located on the locating pin upwardly adjacent the shoulder allowing the side wals to self position slightly relative to the splitting means during the splitting.

5. The apparatus of claim 1 including second flattening means located on the frame, operably engaged by the activation means, and configured for forming a comparatively larger, flattened terminal portion on the other web end of the web component.

6. The apparatus of claim 5 wherein the drive means is reciprocative and the shearing and flattening means, the splitting means and the second flattening means are interconnected in a manner such that the shearing and flattening means and the splitting means are activated on a first stroke of the drive means and the second flattening means are activated on the reverse stroke.

7. The apparatus of claim 5 wherein the second flattening means includes indexing means, comprising;
    a. an index plate configured to index the web end longitudinally relative to the second flattening means, and
    b. antitwisting means allowing positioning of the web end angularly relative to the second flattening means in a manner for preventing twisting of the web component about its longitudidnal axis during the flattening.

* * * * *